United States Patent [19]
Sanz

[11] Patent Number: 5,954,109
[45] Date of Patent: *Sep. 21, 1999

[54] MODULAR AIRCRAFT WINDOW UNIT

[75] Inventor: Eduardo Sanz, San Antonio, Tex.

[73] Assignee: MSA Aircraft Interior Products, Inc., San Antonio, Tex.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/868,183

[22] Filed: Jun. 3, 1997

Related U.S. Application Data

[63] Continuation-in-part of application No. 08/533,168, Sep. 25, 1995, Pat. No. 5,662,152.

[51] Int. Cl.⁶ .......................................................... E06B 9/30
[52] U.S. Cl. ............................... 160/168.1 P; 160/172 R; 160/84.02
[58] Field of Search ............................ 160/84.02, 84.04, 160/84.06, 84.01, 107, 172 R, 168.1 P, 90, 98, 188, 310, 84.09, 84.11, 201

[56] References Cited

U.S. PATENT DOCUMENTS

| | | | |
|---|---|---|---|
| 4,503,900 | 3/1985 | Osaka et al. | 160/107 X |
| 4,679,610 | 7/1987 | Spraggins | 160/107 |
| 4,915,152 | 4/1990 | Magee | 160/31 |
| 4,998,576 | 3/1991 | Moreno | 160/90 |
| 5,082,043 | 1/1992 | Moreno | 160/90 |
| 5,083,598 | 1/1992 | Schon | 160/84.02 |
| 5,584,331 | 12/1996 | Lin | 160/172 R |
| 5,662,152 | 9/1997 | Sanz et al. | 160/84.02 |

Primary Examiner—David M. Purol
Attorney, Agent, or Firm—Miller, Sisson, Chapman & Nash, P.C.

[57] ABSTRACT

The present invention relates to a modular window unit for an aircraft comprising a nonopaque lens and a reveal, the reveal joining the lens, as well as a shade comprising a multiplicity of discrete elongated panels, each panel cooperating with one another and being movable between an open and a closed position. The panels lay one next to the other to substantially cover the lens when the window shade is closed and, in an open position, lay stacked atop each other to substantially uncover the lens. Electric motors are provided for moving the panels of the shade between the open and closed positions.

17 Claims, 7 Drawing Sheets

MODULAR AIRCRAFT WINDOW UNIT

This application is a continuation-in-part of U.S. application Ser. No. 08/533,168 filed Sep. 25, 1995 now U.S. Pat. No. 5,662,152.

FIELD OF THE INVENTION

A modular aircraft window unit having a shade comprised of a multiple of separate panels with a mechanism for raising and lowering a window shade; more specifically, a pair of scissored levers engaging a drive means at one end and a shade rail for raising and lowering a window shade.

BACKGROUND OF THE INVENTION

Most aircraft windows have shades to control the amount of light entering the interior of the aircraft. The simplest aircraft window is typically comprised of retractable shade material with a rail along the bottom. The rail typically has a tab that can be gripped by the passenger for sliding vertically between a closed (usually down) position, in which the window is covered, and an open (usually up) position, allowing light into the cabin.

However, many aircraft, including typically those in the executive jet aircraft class, have rather expensively appointed interiors, including custom designed windows. Sometimes these windows are electric, sometimes manual, or sometimes electric with manual overdrives. These custom interiors also may feature modular windows with shades located between an inner lens and an outer lens and activated by a mechanical or electrical mechanism operated by the passenger. These modular windows, often built by aftermarket supply firms and fitted at modification centers ("mod centers"), have shades made of a variety of materials; but typically, the materials are collapsible between an extended (down or closed) position and a retracted (up or open) position. An example of such a modular window unit with a retractable shade may be found in U.S. Pat. No. 4,679,610 (Spraggins, 1987). The '610 patent features a modular, self-contained window unit having two panes of transparent, impact-resistant glass secured by a frame and having a shade made of a collapsible sheet movable between an open and closed position.

Shade materials are typically pleated and collapsible with sufficient rigidity to maintain their shape, form, and uniformity. Manufacturers of present window shade material include Hunter-Douglas. However, shade material suppliers are limited in the styles and color section which can be provided.

Advantages exist in being able to use any upholstery material or fabric. The use of any upholstery material or other fabric increases the design opportunity available to the interior designer for coordinating the colors and textures of the interior of the aircraft to the window shade material. Thus, greater flexibility is provided in an aircraft window shade which can use any flexible fabric, rather than the limited selection of presently available shade materials.

Some of the present aircraft windows utilize a "Roman shade", that is, one having horizontal pleats. These, however, utilize a bar or rod, or a series of bars or rods, extending horizontally across the windows. From these bars or rods is a draped fabric, typically backed with thin foam (such as Insulite). The bars or rods are raised and lowered, deploying fabric as they are lowered and gathering it up as they are raised. Typically, the fabric is a single sheet with multiple pleats and multiple bars or rods. It does not tend to hold its shape well, tends to be heavy, and bulky, especially when the shade is in a raised or up position. Further, it has a limited ability to block out heat, light, and sound, even when in a down or closed position.

Aesthetics are a very important consideration in the design of aircraft interiors, including windows, especially for private or corporate jets. For example, in the aforementioned shade, it is more attractive to conceal as much of the mechanical mechanism which raises and lowers the shades as possible. Some mechanical window shades utilize chains, cables, or the like to raise and lower the shade, which means are often visible to the passenger, especially if the passenger looks through the window at an oblique angle.

Moreover, when the shade to be raised and/or is a "Roman shade" or a shade made of discreet horizontally segmented panels, it is desirable that, when such shade is raised or lowered, the separation between the pleats (or panels) remains proportional. That is, when the shade is in a down position (lowered or closed), the pleats (or panels) are a certain distance apart. As the shade is raised, it is aesthetically desirable for the distance between the adjacent pleats (or panels) to decrease proportionately rather than, say, the lowest pleat collapsed to the one just above it and have a successive piling up of the pleats (or panels) as the shade is raised. It is also important in a shade that the pleats (or panels) be kept parallel to one another and perpendicular to the edges of the window. In other words, as the shade is raised and lowered, it is important that the pleats (or panels) be kept parallel and the proportional separation of adjacent pleats (or panels) decrease and increase proportionately as the shade is raised and lowered. Last, it is important to have the ability to use non-opaque panels as pleats (the panels being covered with fabric). Non-opaque panels especially assist in visible and ultraviolet light for further passenger comfort. Such panels also help keep the fabric neater and straighter during window shade operation.

SUMMARY OF THE INVENTION

Applicant seeks to expand the design options for aircraft interior designers in providing a window unit having a shade capable of utilizing for upholstery material or other flexible fabric material.

This and other objects are provided for in a window unit having a shade consisting of a series of flat or curved, rigid, typically composite panels covered with fabric and installed on the reveal in a manner that allows them to move between an open and closed position, the closed position with the panels stacked one behind the other, the open position allowing them to lay flat, one next to the other. When the shade is in an extended or closed position, it offers protection against light, noise, and fabric collapse.

The panels of the shade are typically upholstered by the Mod center and, therefore, obtain design flexibility previously unavailable.

The entire window unit having Applicant's unique shade is typically manufactured in a self-contained, easy-to-install assembly.

A further object of this invention is to provide for, in an aircraft window, a shade that is attractive; and a segmented shade that maintains proportional separation as the shade is raised or lowered while keeping the pleats parallel to one another and perpendicular to the edges of a window frame, which allows the use of panels to separate pleats and for increased light blockage.

These and other objects are provided for in a window for an aircraft, the window comprising a generally rectangular frame with side tracks; a multiplicity of shade rails with separate shade sections attached thereto, the shade rails engaging, through the removed ends thereof, the side tracks of the frame; drive means; a pair of scissored levers having first and second ends with a body portion therebetween, the body portion engaged to at least some of the shade rails, the levers of said pair with the first ends engaging said drive means, the second ends engaging at least one of said multiplicity of shade rails, for moving between an open and a closed position, the open position with the shade rails separated in the closed position with the shade rails adjacent to one another.

These and other objects are provided for in the window described above wherein the body of said levers of said scissored pairs slidably engages each of said multiplicity of shade rails and further including a multiplicity of shade panels for engaging the shade rails as well as means for maintaining alignment of the shade rails so that they are parallel to one another and perpendicular to the side tracks.

These and other objects are further provided for in the aircraft window set forth above which further includes two sets of scissored levers, each set having a pair of scissored levers which slidably engage at least some of the slide rails and further having, as a drive means thereof, an electric motor driving a lead screw, the lead screw engaging the first end of said pair of said scissored drive levers.

BRIEF DESCRIPTION OF THE DRAWINGS

FIG. 9A is a detailed view of the slider and shade rail structure.

FIGS. 11A, 11B, and 11C are exploded, side elevational views of the shade rail shade panel connections of Applicant's invention.

DETAILED DESCRIPTION OF THE PREFERRED EMBODIMENT

Applicant provides a modular window unit (10) which incorporates a typically transparent lens (12) supported and typically surrounded by a reveal (14) which acts as the body of the window unit and typically is made from fiberglass or a composite material. Applicant's modular window unit (10) includes a shade (16) movable between a closed or down position (FIG. 2) and an open or up position (FIG. 3) or any position therebetween (see FIG. 1, partially open).

Figure 6A:
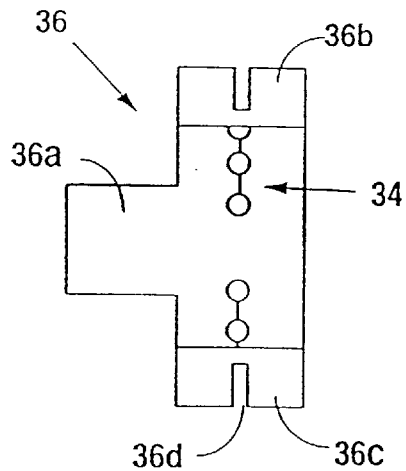
FIGS. 6A and 6B are front and side elevational views, respectively, of the belt engagement member of the drive mechanism of the shade of Applicant's modular window unit.
Figure 6B:
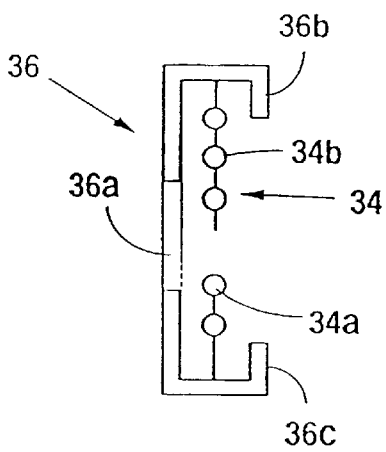
Figure 7:
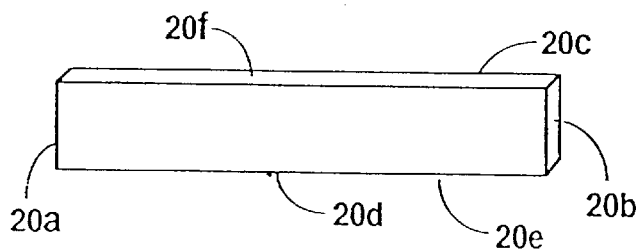
FIG. 7 is a perspective view from the front of a panel of Applicant's shade.

With reference now to FIGS. 1–8, it is seen that the modular unit of Applicant's invention provides for a unique shade having a multiplicity of panels, here, by way of example and not limitation, five in number and designated as panels (18a) through (18d), movable, as well as a fixed or valence panel (18e). With reference to FIG. 7, each panel is seen to have the removed ends (20a) and (20b), a top edge (20c), a bottom edge (20d), a front surface (20e), and a rear surface (20f). The panels engage one another and also engage the reveal (14) through guide means (22a), the function of guide means (22a) being to maintain proper alignment among the panels and with the remainder of the modular unit, more specifically, the reveal (14). Panels (18a) through (18d) (movable) also are engaged to drive means (22b) as is more specifically illustrated in FIGS. 6A and 6B. Drive means (22b) is powered typically by a pair of motors (38a) and (38b) whose speed is controlled through a pair of speed control modules (40a) and (40b).

Figure 1:
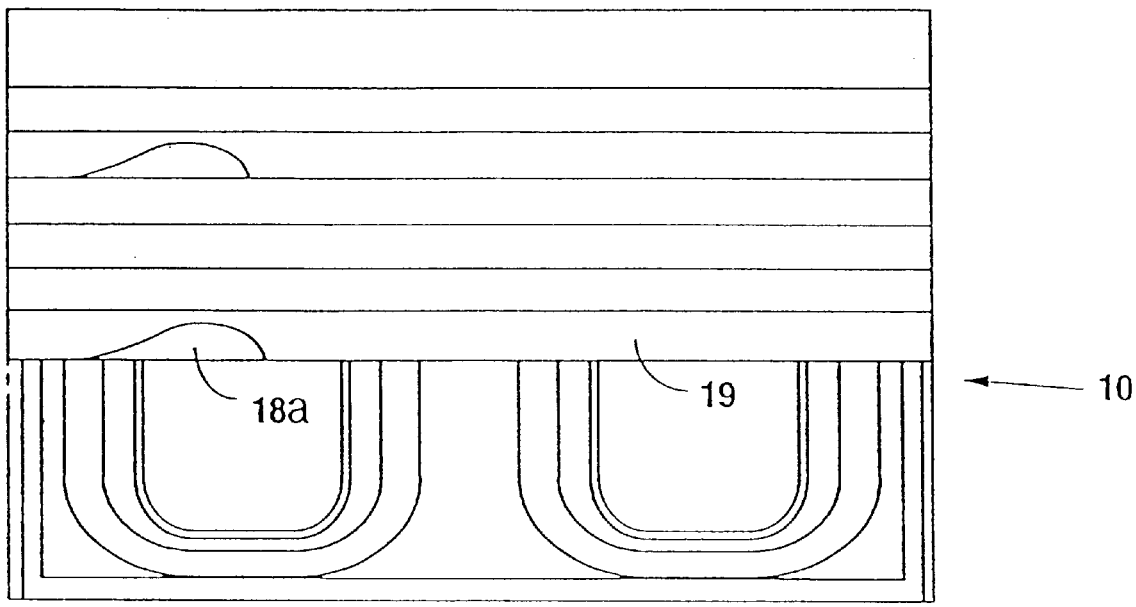
FIG. 1 is a front elevational view of Applicant's modular window unit featuring the pleated shade.
Figure 2:
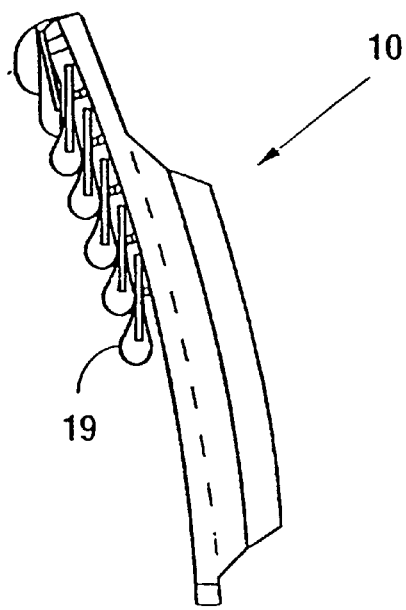
FIG. 2 is a side elevational view of Applicant's modular window unit.
Figure 3:
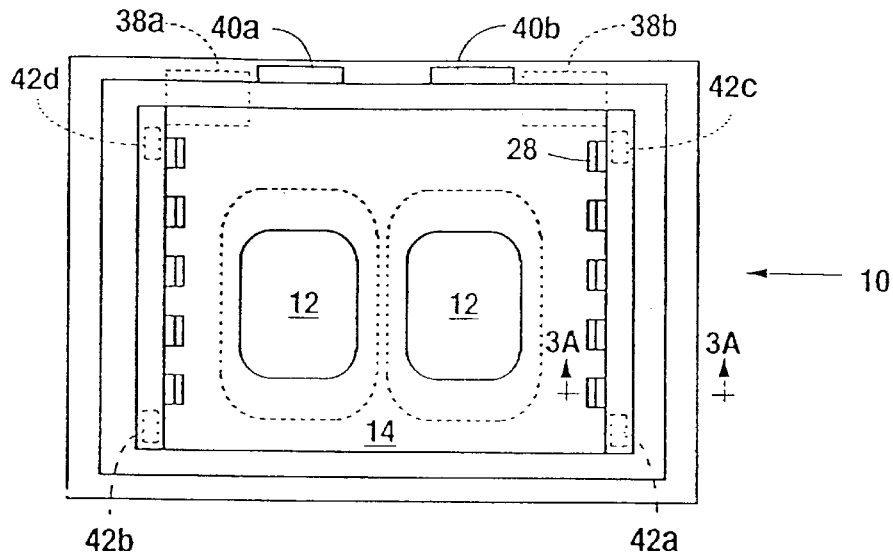
FIG. 3 is a front elevational view of Applicant's modular window unit with the shade panels partially removed to illustrate some of the interior mechanism.
Figure 3A:
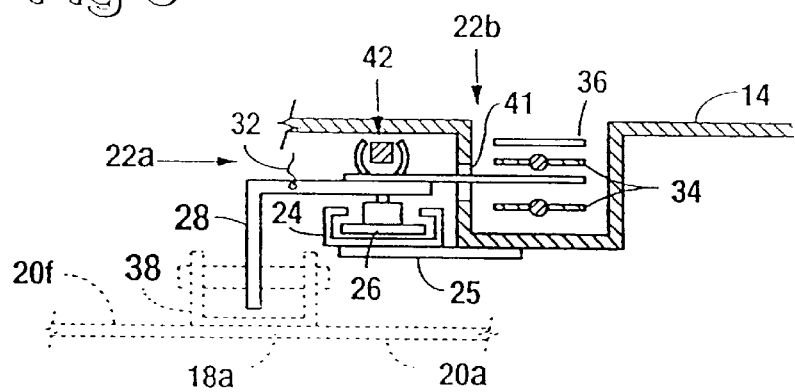
FIG. 3A is a detailed view of the track mechanism.

With reference to more details in the figures, it is noted that FIGS. 1 through 3 illustrate shade (16) comprising a multiplicity of panels, including a plurality of movable panels (18a) through (18d) and a fixed panel (18e) attached horizontally along the top of the reveal (14) in a fixed position. It is further seen that each of the panels (movable as well as fixed) has draped over the exterior a fabric (19), typically cloth, typically an upholstery-type cloth fabric, draped over the panel itself. The panel itself is typically flat or slightly curved; providing a panel slightly curved in cross section (see FIG. 4) gives some rigidity or stiffness to the panels. The panels are typically comprised of P.V.C. foam core with fiberglass skins and are typically about 0.12 inch thick. The panels stretch horizontally across the windows to cover the lens (12) as well as substantially cover the reveal (14). The panels could cover one, two, three, or more lenses. It is noted, specifically with reference to FIGS. 2, 4, and 5, how the panels, in an up or retracted position, stack one beneath the other. In a full down position (see FIG. 4), the panels typically lay with their top edge of one panel just adjacent to or just beneath the bottom edge of the panel below it. In a full down (shade closed) position, bottom edge (22d) of panel (18a) will typically shut off view of the reveal (14) and/or lens (12) from the interior of the aircraft. In a position between full down or full up, there is partially overlap of panels, as may be appreciated with reference to FIG. 2.

It is noted with reference to FIGS. 1 and 2, especially FIG. 2, how upholstery or cloth (19) tends to drape over the panel just below it to give a pleasing pleated effect. Upholstery (19) may be attached to panels (18a) through (18e) by gluing, fastening with clips along the top edge of the panels, or other means.

As the panels move between the up and the down position, they must maintain alignment with one another as well as alignment with the reveal. Proper alignment requires that the moving panels maintain a parallel alignment with one another as well as with the top and bottom edges of the window unit. This is done by incorporating a guide mechanism which allows the movable panels to cooperate with the reveal and each other to maintain such an alignment.

Figure 8:
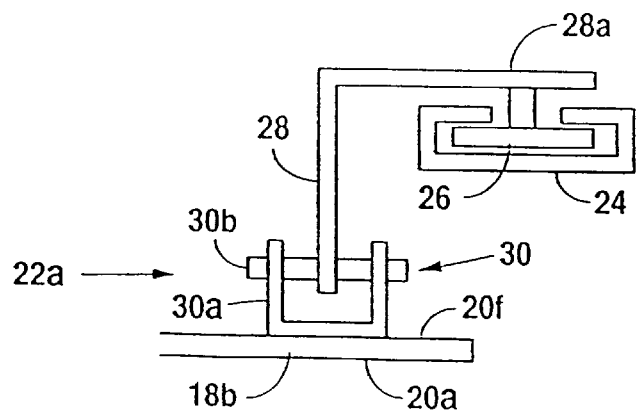
FIG. 8 is a top elevational view of the guide (tracking) mechanism of Applicant's modular window unit.

FIG. 8 reveals details of guide means (22a). Each of the movable panels will utilize guide means on each end. Here, reference is made (for the sake of example) to panel end (20a) of movable panel (18b). It is seen in FIG. 8 that, attached to rear surface (20f) of panel end (20b) of panel (18b) is a panel support member mounting means (30) which is comprised of a U-shaped bracket (30a) and a pin (30b) extending between the two opposite arms of the "U" of U-shaped bracket (30a). Articulating on pin (30b) is panel support member (28) typically L-shaped and made of aluminum. Removed end (28a) of panel support member (28) has attached thereto nylon slider (26), which here is seen to be T-shaped, and engages track (24), typically channel aluminum, which is attached to reveal (14) as is more clearly illustrated with reference to FIG. 6A, by attachment plate (25). The slider rides in the track as the shade moves, keeping the panels from wandering laterally. It is to be pointed out that pin (30b) allows the articulation of panel support member (128) such that the panels can pivot as they ride over the curved surface of the track (see FIG. 2).

Each end of each movable panel is provided with this guide means. Included on each panel support member (28) of the movable panels is a length of string (32) (see FIG. 6A) which attaches to the top of panel support member (28) and to the bottom of the adjacent panel support member just above. The strings are equal in length and will control the distance between adjacent panels when the shade is in the open position. See FIG. 4 with reference to the manner in which strings allow for proper separation of one shade with respect to the other.

Applicant also provides for a drive mechanism or drive means (22b) to power the windows between the up and down position or to stop at any place therebetween. With reference to FIGS. 1 and 6A, it is seen that the drive mechanism is provided through engagement at removed panel ends (20a) and (20b) of the lowest panel, here movable panel (18a), of a belt engagement plate (36). More specifically, belt engagement plate (36) has a leg (36a) for extending through a slot (41) in the walls of the reveal (14), here the walls of the reveal (14) are convoluted to incorporate Applicant's drive means (see FIG. 6A) and belt. The leg of belt engagement plate (36) attaches to panel support member (28) at or near the removed end thereof. Belt engagement plate (36) also has, opposite the leg, removed arms (36b) and (36c) which are J-shaped and include slots (36d). The slots are dimensioned for receipt of a belt (34) therein, but are sufficiently narrow to capture balls (34a) spaced along chain (34b) of belt (34) such that movement of the belt is transmitted to belt engagement member (36). Further, it is seen with reference to FIGS. 6A and 6B how the belt ends are captured in the slots between arms (36b) and (36c) of belt engagement member (36). The belt is driven by a gear (not shown) which is attached to the output shafts of the electric motors, here typically two motors, as illustrated at (38a) and (38b). The motors are energized by the electrical system of the aircraft, through speed control modules (40a) and (40b) and passenger-accessible switches. Suitable motors may be purchased from Micromotors of St. Petersburg, Fla., as Model No. 2233F030. Suitable speed control modules are manufactured by Total Texas Technologies as part No. MSA-08B.

Magnetic limit switches provide for a means of cutting off the electric motors when the panel ends reach the up or down limit. More specifically, magnetic switches (42a) through (42d) are connected to the motors to shut off and deenergize the motors when shade (18a) reaches the lower position—magnetic switch (142a) to motor (38a) and magnetic switch (42b) to motor (38b)—or the upper position—magnetic switch (42c) to motor (38b) and magnetic switch (42d) to motor (38a). The magnetic limit switches are mounted to the reveal (14) and wired to the proper motor. It is seen that, if one end lags slightly lower than the other at the lower limit of travel, the magnetic switch will shut off the motor for the lower end earlier than the other, allowing for a self-leveling effect. Going up, the lower end motor will stay on longer to let the lower end "catch up". When the shade is first installed, the technician will adjust the speed control module so the motors raise and lower the shades at the same rate, thus tending to maintain proper shade alignment. Nonetheless, should the speed drift somewhat or other events occur, the use of two motors with independent sets of limit switches allow for self-leveling.

Applicant's novel window may be used in aircraft as well as any suitable and appropriate environment. Recreational vehicles, yachts, and trains may also take advantage of the improvements and utility offered by Applicant's design.

Figures 4, 5:
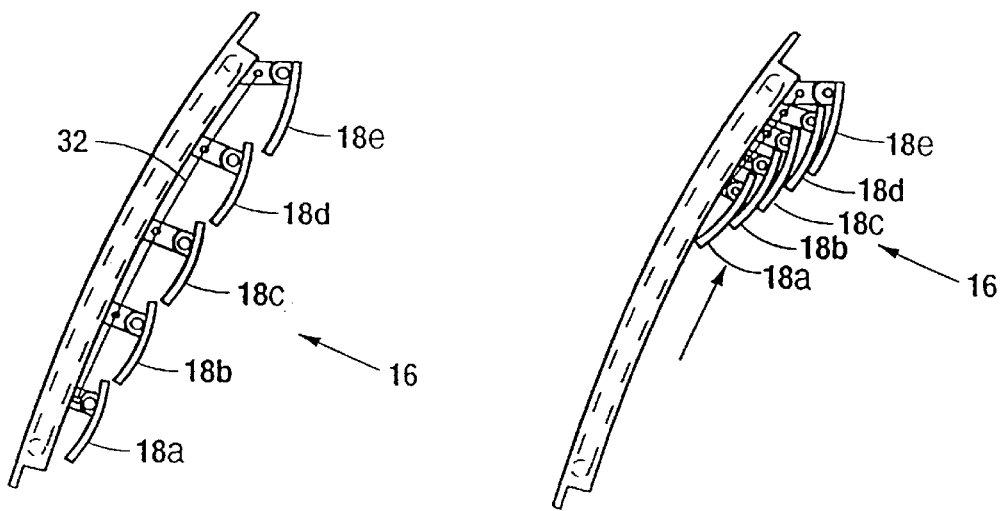
FIG. 4 is a side elevational view of Applicant's modular window unit with the shade in the down position.
FIG. 5 is a side elevational view of Applicant's modular window unit with the shade in the up position.

When the shade is in the full up position, the panels are stacked, suspended generally vertically as indicated in FIG. 5, with the outer panels covering at least half or more of the surfaces of the panels just below (see also FIG. 2). When the motors are energized, the entire stack of movable panels (18a) through (18d) will begin to move down until the string between (18e) and (18d) is taut, at which time panel (18d) will be deployed. Continued movement downward from there will subsequently deploy panels (18c), (18b), and finally (18a) will reach its limit switch at about the time it is fully deployed beneath panel (18b). The use of a string, along with a curved track and the articulating pin (30b) allows for the movement of the shade along a curved path. That is, the profile of the window unit is typically curved, as may be appreciated with reference to FIG. 2, to correspond to the curve of the interior of the aircraft cabin.

It should be appreciated that each panel is suspended and allowed to hang generally vertically on pins (30b), whether the shade is up or down or in between. Further, these pins may be of the quick-release type or a ball-lock type pin. The advantage of such a pin is the ease of removal, especially important as it is anticipated that a unit with uncovered panels will be shipped to Mod centers for the Mod center to cover and install. The less work (and ease) in installing the panels (after covering) by the Mod center, the more attractive the unit is. A ball-lock type pin may be used to install the panels without the use of tools.

When the shade is in a full down position and is activated, the drive means will act on panel (118a) and retract it until it engages the panel just above it—panel (18b). Further retraction will allow the two panels to move as a unit and subsequently pick up panels (18c) and (18d) as they move to the full up position.

It is noted that Applicant's unique shade may be raised manually by mechanical actuation. Means of mechanically raising shades are described in Applicant's earlier patents, including U.S. Pat. Nos. 4,679,610; 4,998,576; and 5,082,043, which patents are incorporated herein by reference. Additional applications of Applicant's window include military vehicles, including light armor vehicles. Indeed, Applicant's unique panels may be constructed of bulletproof and/or bullet-resistant Kevlar and/or fiberglass composites.

The surfaces (outer or inner) of Applicant's panels may be covered flush with fabric, leather, wood grain finish, paint, mirror surfaces (such as polished aluminum or the like), or other suitable material. Applicant's panels may have a coating on the outside surface comprising a metallic sheet or the panel itself may be metallized or have a reflective coating to help reflect intense light and/or radiation. The panel may have a soft coating on the inside of the shade. The core of the panel itself may be made of graphite or a carbon/graphite composite. Panels may be made of a graphite or phenolic skin on an inboard side of a honeycomb core, with a polished aluminum skin on the outside. Such a panel would help prevent or minimize light flash and heat from an atomic or nuclear blast, especially when fitted in a AWAC (Airborne Command Post).

Other appropriate materials of which panels may be constructed include NOMEX® or a NOMEX®/felt composite or honeycomb material (with or without skin) which is light, strong, and sufficiently fire resistant to comply with most aircraft regulations and specifications.

Figure 9:
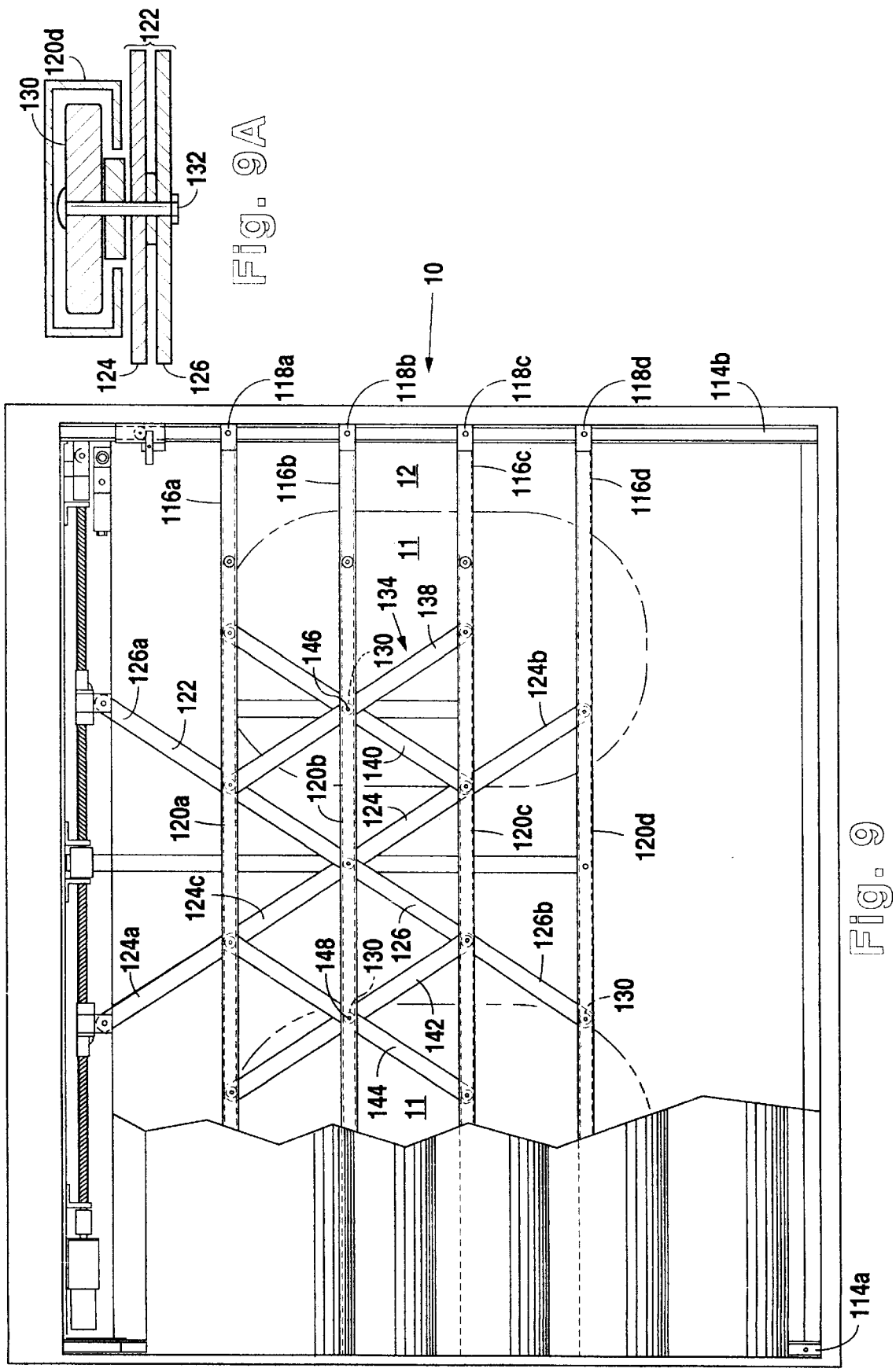
FIG. 9 is a front elevational view of Applicant's mechanism for raising and lowering a shade of an aircraft window.
Figure 10:
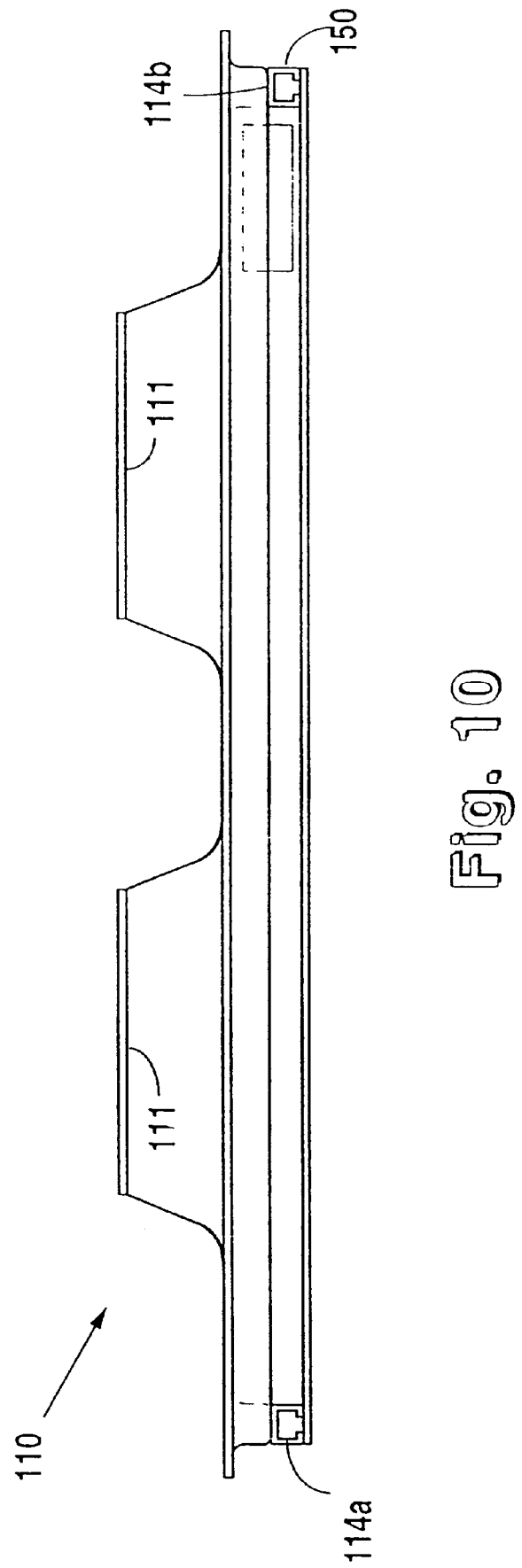
FIG. 10 is a top elevational view of Applicant's mechanism for raising and lowering the shade of an aircraft window.
Figure 11:
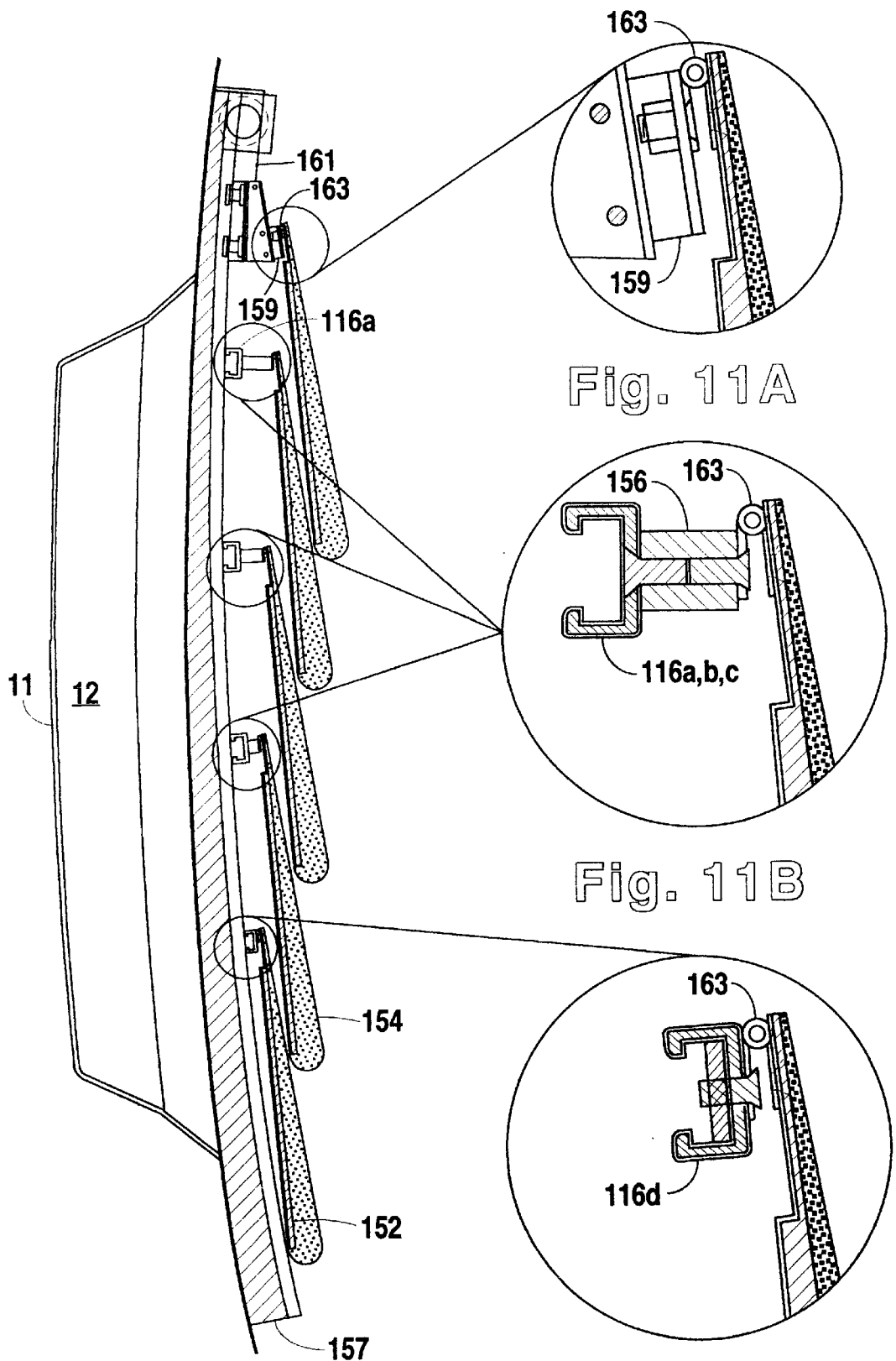
FIG. 11 is a side elevational view of Applicant's mechanism for raising and lowering the shade of an aircraft window.

With reference to FIGS. 9–11, it is seen that, in an alternate preferred embodiment, Applicant provides an aircraft window (10) having a generally rectangular frame or body (12), typically made of fiberglass or a composite material which has openings defining windows (11) therein. On either side of the frame or body, there are attached side tracks or rails (114a) and (114b) which will guide the shade as it is raised and lowered between an open and closed position. The side rails maintain proper alignment and tracking for the shade as further set forth below.

Extending between the side rails (114a) and (114b) are a multiplicity of shade rails (116a), (116b), (116c), and (116d). The shade rails are rigid, linear members having ends (118a), (118b), (118c), and (118d) at the removed ends of bodies (120a), (120b), (120c), and (120d). The removed ends of the shade rails slidably engage side rails (114a) and (114b) as the shade rails move between an open and closed position.

Operating on and engaging shade rails (116a)–(116d) are a pair of scissored levers (122), the pair having a first lever (124), the first lever having a first end (124a), a second end (124b), and a body (124c) between the first end and the second end. A second lever (126) of the lever pair (122) (and engaging lever (124)) has a first end (126a), a second end (126b), and a body (126c). Sliders (130) are used to engage each of the levers (124) and (126) with the back of shade rails (116a)–(116d) as set forth in FIGS. 9 and 9A, it being noted that the pair of scissored levers (122) articulate with one another on a bushing or pin (132) as designated in FIG. 9A. Pin (132) functions to engage both levers (124) and (126) so they articulate with one another and also to slidably engage, through use of slider (130), the two levers of lever pair (122) with the rear of shade rail (116b). Further, it is seen that sliders (130) allow slidable engagement with various points on the bodies and second ends of levers (124) and (126) with the rear surfaces of shade rails (116a)–(116d).

However, with reference to FIG. 9, it is further noted that there are, engaging the shade rails, a first pair of alignment levers (134) and a second pair of alignment levers (136). The first pair of alignment levers is comprised of a first lever (138) and a second lever (140). The second pair of alignment levers is comprised of a first lever (142) and a second lever (144). First pair of alignment levers (134) articulate at pin (146) and there have a slider (130) which functions to slidably engage the pair to the rear of shade rail (116b) and maintains the first lever (138) and second lever (140) in pivoting engagement (in the same fashion as set forth in FIG. 9A). Likewise, first lever (142) and second lever (144) of second pair of alignment levers (136) articulate at pin (148) and engage the rear of shade rail (116b) by use of another slider (130); pin and slider function to slidably engage the pair of second alignment levers (136) with the rear of the shade rail (116b) as well as to pivotally engage first lever (142) and second lever (144) of the second pair of alignment levers. Note, however, that both pairs of alignment levers, at their removed ends, engage, through the use of sliders (130) and shade rails (116a) and (116c). The use of such paired, scissored alignment levers as set forth here helps the mechanism to maintain the shade rails in parallel alignment with one another during the raising and lowering of the shade between an open and a closed position and keeps them separated as they close.

Further details of Applicant's mechanism can be seen with reference to FIG. 10. More specifically, side rails (114a) and (114b) are seen to be comprised of generally C-shaped channels (150). A similar C-shaped channel is used for the shade rails (see FIG. 9A). In both cases, sliders (130) fit within the "C" and typically consist of nylon disks appropriately dimensioned. The nylon disks used in conjunction with the C-shaped aluminum shade rails and side rails allow for ease of movement. The use of this system eliminates the need for a chain drive to raise and lower the shade rails.

Additional details of Applicant's invention can be seen with reference to FIGS. 9 and 11. More specifically, it is seen that Applicant provides a multiplicity of shade panels (152), each one attachable to a shade rail along the upper surface of the shade panel. The shade panel may be formed from a nonopaque rigid or flexible material. The use of PVC with a foam core approximately 1/16" to 1/8" thick has proved to be effective. The shade panel may be draped with a shade fabric (154) in any choice of color or pattern and material which would be suitable to the decor of the aircraft interior. Sometimes, shade panels (152) with shade fabric (154) thereon engage, along the upper surface, the shade rails through the use of standoffs (156) staggered in length to allow the panels to properly cluster when the shade is closed. The panels are easily removed from their respective shade rails by toolless snaps, Velcro®, or other fasteners known in the art. A spacer (157), tapered or untapered, may be used between the frame or body and the side rails to set off the shade or give the shade an appropriate position with respect to the aircraft interior. A floater rail (159) suspended on a card (161) may be used, attaching to the side rails through the use of a bracket (163). This rail does not attach to any lever and simply rides up when struck from below by shade rail (116a) when the shade is moving to an "up" position (window open) When the shade moves to a "down" position (window closed), floater rail (159) drops until the cable is taut.

FIGS. 11A, 11B, and 11C illustrate further details. It is seen that standoffs may be used to help shade spacing and that hinges (163) may be used to allow shades to pivot with respect to the shade rails.

Figure 12:
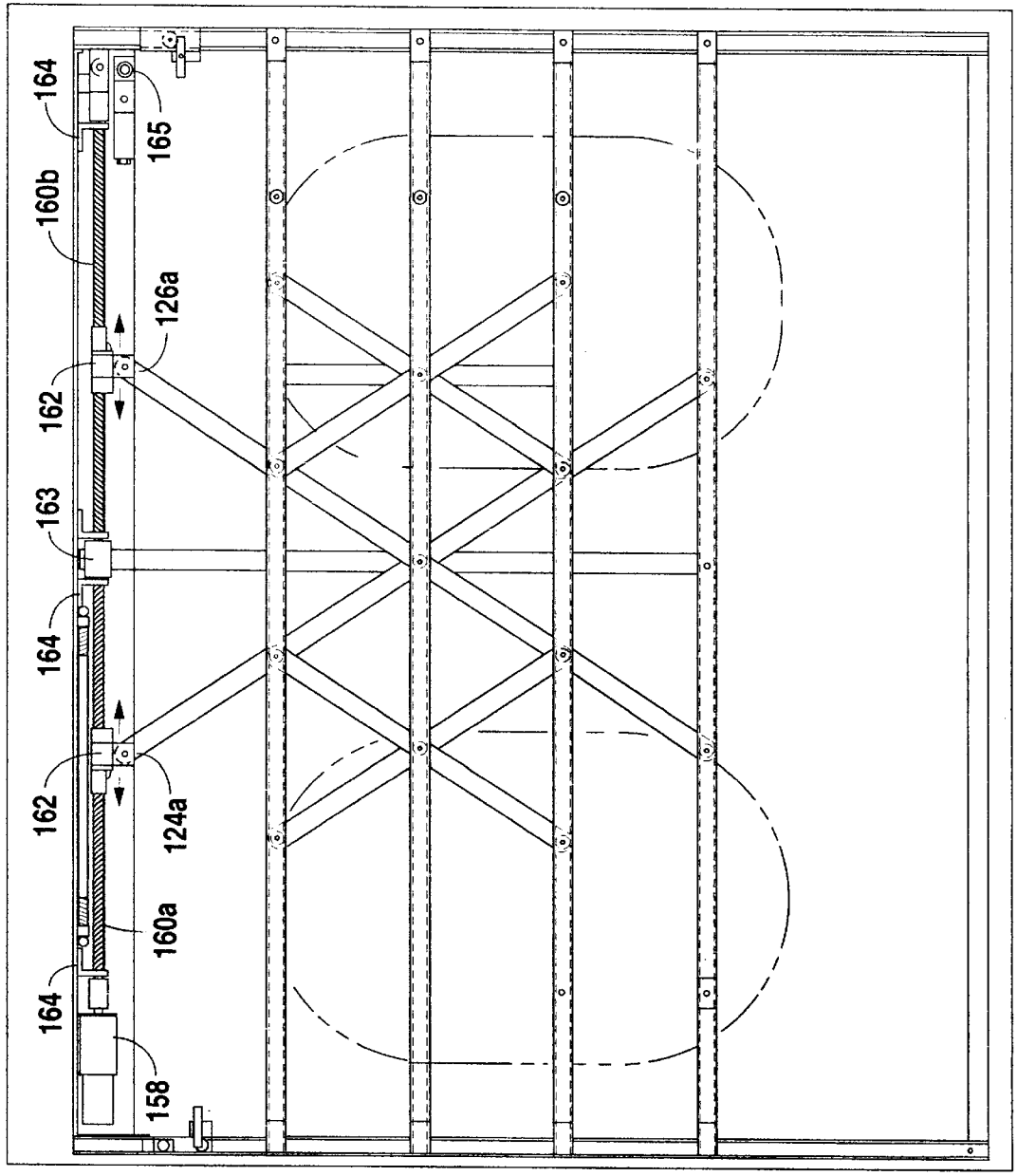
FIG. 12 is a front elevational view of Applicant's invention showing the motor and related structures.

With reference to FIG. 12, an electric motor (158), powered by the aircraft, electric system and controlled through the use of a switch (not shown) known in the art, which switch is accessible to the passenger of the aircraft, is utilized to provide energy to raise and lower the shade rails. More specifically, motor (158) drives a pair of lead screws (160a) and (160b). It is noted that these two lead screws are threaded in opposite directions; for example, lead screw (160a) having a left-hand drive and lead screw (160b) having a right-hand drive, the two lead screws are coupled through the use of connector (163). The lead screws engage first ends (124a) and (126a) of levers (124) and (126) through the use of rifled couplers (162) such that, when the lead screws are energized, the couplers transmit the rotational motion to translational along the axis of the lead screws and move the first ends of levers (124) and (126) together or apart along such axis. It is seen that a series of brackets (164) is provided for mounting the lead screw to the frame near the upper edge thereof. Limit switch (165) is provided to deenergize electric motor (158) when struck by the upper edge of the uppermost rail (the floater rail, if one is used).

The above description sets forth the details of the mechanical components of Applicant's present invention. More specifically, it illustrates the use of an electric motor to energize a series of shade rails through the use of a pair of levers operating off a motor driven lead screw or other mechanical means to drive one end of the lever pair to raise or lower the window shade. The window shade itself is a series of discrete panels, raised and lowered in unison. Further, Applicant provides a means to maintain alignment of the window rail during the raising and lowering process.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A window for an aircraft, the window comprising a generally rectangular frame with side tracks attached thereto;

a multiplicity of shade rails, the shade rails engaging, at removed ends thereof, each with the side tracks;

drive means;

a multiplicity of shade members, each for engaging each of the multiplicity of shade rails;

a pair of scissored levers, each lever of the pair having a first end and a second end with a body portion therebetween, each lever of the pair engaging the shade rails, the levers with the first end engaging said drive means and the second end engaging one of said multiplicity of rails for moving the shade between an open and a closed position, the open position with the shade rails separated and apart from one another and the closed position with the shade rails adjacent one another wherein the bodies of each of said levers of said scissored pair of levers slidably engage each of said multiplicity of shade rails.

2. The window as set forth in claim 1 wherein the levers of the pair of scissored levers engage one another at a pin, the pin also engaging a slider, the slider attached to one of the shade rails.

3. The window of claim 1, wherein the shade members are opaque.

4. The window of claim 1 further including alignment means for maintaining the shade rails in parallel position to one another and perpendicular to the side tracks of said frame.

5. The window of claim 4, wherein said alignment means further includes at least two sets of scissored levers, each set comprising a pair of scissored levers which slidably engage at least some of the shade rails.

6. The window of claim 1, wherein said drive means includes an electric motor driving a lead screw, the lead screw engaging the first end of each lever of said pair of scissored levers.

7. The window of claim 1, wherein said levers of said pair of scissored levers articulate adjacent one of said multiplicity of shade rails and are in slidable engagement therewith.

8. The window of claim 1, wherein said levers are capable of maintaining parallel separation of the shade rails as they move the shade rails between an open and a closed position.

9. A window for an aircraft, the window comprising a generally rectangular frame with side tracks attached thereto;

a multiplicity of shade rails, the shade rails engaging, at removed ends thereof, each with the side tracks;

drive means;

a multiplicity of shade members, each for engaging each of the multiplicity of shade rails;

a pair of scissored levers, each lever of the pair having a first end and a second end with a body portion therebetween, each lever of the pair engaging the shade rails, the levers with the first end engaging said drive means and the second end engaging one of said multiplicity of rails for moving the shade between an open and a closed position, the open position with the shade rails separated and apart from one another and the closed position with the shade rails adjacent one another wherein the levers of the pair of scissored levers engage one another at a pin, the pin also engaging a slider, the slider attached to one of the shade rails.

10. The window of claim 9 wherein the bodies of each of said levers of said scissored pair of levers slidably engage each of said multiplicity of shade rails.

11. The window of claim 9 further including a multiplicity of shade panels, each of said shade panels for engaging one of the shade rails of said multiplicity of shade rails.

12. The window of claim 9 wherein the shade members are opaque.

13. The window of claim 9 further including alignment means for maintaining the shade rails in parallel position to one another and perpendicular to the side tracks of said frame.

14. The window of claim 13 wherein said alignment means further includes at least two sets of scissored levers, each set comprising a pair of scissored levers which slidably engage at least some of the shade rails.

15. The window of claim 9 wherein said drive means includes an electric motor driving a lead screw, the lead screw engaging the first end of each lever of said pair of scissored levers.

16. The window of claim 9 wherein said levers of said pair of scissored levers articulate adjacent one of said multiplicity of shade rails and are in slidable engagement therewith.

17. The window of claim 9 wherein said levers are capable of maintaining parallel separation of the shade rails as they move the shade rails between an open and a closed position.

* * * * *